United States Patent
Ghose et al.

(10) Patent No.: US 11,141,858 B2
(45) Date of Patent: Oct. 12, 2021

(54) SYSTEM AND METHOD FOR FAULT DETECTION IN ROBOTIC ACTUATION

(71) Applicant: Tata Consultancy Services Limited, Mumbai (IN)

(72) Inventors: Avik Ghose, Kolkata (IN); Swarnava Dey, Kolkata (IN); Arijit Mukherjee, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 224 days.

(21) Appl. No.: 16/210,512

(22) Filed: Dec. 5, 2018

(65) Prior Publication Data
US 2019/0283254 A1 Sep. 19, 2019

(30) Foreign Application Priority Data
Mar. 17, 2018 (IN) .............................. 201821009841

(51) Int. Cl.
  *B25J 9/16* (2006.01)
(52) U.S. Cl.
  CPC ............. *B25J 9/1674* (2013.01); *B25J 9/161* (2013.01); *B25J 9/163* (2013.01); *B25J 9/1697* (2013.01); *G05B 2219/24082* (2013.01); *G05B 2219/24083* (2013.01); *G05B 2219/31357* (2013.01); *G05B 2219/39271* (2013.01)
(58) Field of Classification Search
  CPC . B25J 9/1674; B25J 9/161; B25J 9/163; B25J 9/1697; B25J 9/1682; G05B 2219/24082; G05B 2219/24083; G05B 2219/31357; G05B 2219/39271
  See application file for complete search history.

(56) References Cited

U.S. PATENT DOCUMENTS

| | | | |
|---|---|---|---|
| 5,634,039 A | 5/1997 | Simon et al. | |
| 2008/0222646 A1* | 9/2008 | Sigal | G06F 9/505 718/105 |
| 2018/0222043 A1* | 8/2018 | Trovero | G06F 16/285 |

OTHER PUBLICATIONS

Hoa Khanh Dam, A deep tree-based model for software defect prediction, Feb. 3, 2018, (Year: 2018).*
Yuzhou Liu, Time and Frequency Domain Long Short-Term Memory for Noise robust Pitch Tracking, 2017, IEEE (Year: 2017).*

(Continued)

*Primary Examiner* — Jeff A Burke
*Assistant Examiner* — Jamal A Shah
(74) *Attorney, Agent, or Firm* — Finnegan, Henderson, Farabow, Garrett & Dunner, LLP

(57) ABSTRACT

A data driven approach for fault detection in robotic actuation is disclosed. Here, a set of robotic tasks are received and analyzed by a Deep Learning (DL) analytics. The DL analytics includes a stateful (Long Short Term Memory) LSTM. Initially, the stateful LSTM is trained to match a set of activities associated with the robots based on a set of tasks gathered from the robots in a multi robot environment. Here, the stateful LSTM utilizes a master slave framework based load distribution technique and a probabilistic trellis approach to predict a next activity associated with the robot with minimum latency and increased accuracy. Further, the predicted next activity is compared with an actual activity of the robot to identify any faults associated robotic actuation.

11 Claims, 8 Drawing Sheets

(56) References Cited

OTHER PUBLICATIONS

Li, Xingyan et al. "Distributed Sensor Analysis for Fault Detection in Tightly-Coupled Multi-Robot Team Tasks," *2007 Proceedings of IEEE International Conference on Robotics and Automation,* Kobe, Japan, Apr. 10-14, 2007; 9 pages.
Christensen, A.L. et al. (Jan. 2008). "Fault detection in autonomous robots based on fault injection and learning," *Autonomous Robots,* vol. 24, No. 1; pp. 49-67.

* cited by examiner

SYSTEM AND METHOD FOR FAULT DETECTION IN ROBOTIC ACTUATION

PRIORITY CLAIM

This U.S. patent application claims priority under 35 U.S.C. § 119 to: India Application No. 201821009841, filed on Mar. 17, 2018. The entire contents of the aforementioned application are incorporated herein by reference.

TECHNICAL FIELD

The embodiments herein generally relates, in general, to robotics and automation and, in particular, to a system and method for fault detection in robotic actuation.

BACKGROUND

Robotic technologies are currently used to augment low-end robots with enhanced sensor data processing, storing and communication capabilities. In robotic technologies, fault detection is very important for ensuring safety and reliability of a Wireless Sensor and Actuator Network (WSAN) based Cyber Physical Systems (CPS). A CPS system is based on sensors and actuators, especially robots. The CPS system loosely follow the Sense, Analyze and Actuate cycle for performing tasks. A failure in actuation in one unit may cascade to other units causing the overall tasks to fail. Such failures take time to detect and only after detection further actions can be taken to re initiate the task. Generally, the failure in robotic actuation is detected based on high performance computing technologies.

Conventional methods for fault detection in robotic actuation utilizes high end ground truth camera systems and high end ground truth camera systems are not available in multi-robot mission. Further, there is a challenge in detecting actuation fault of humanoid robots in a non-invasive way. Furthermore, the fault detection in robotic actuation requires CPU and memory intensive high performance computing and is not available in conventional systems.

SUMMARY

Embodiments of the present disclosure present technological improvements as solutions to one or more of the above-mentioned technical problems recognized by the inventors in conventional systems. For example, in one embodiment, a method for fault detection in robotic actuation is provided. The method includes receiving a set of tasks in the form of time series from a plurality of robots, wherein the set of tasks includes a set of actuation data associated with each robot from the plurality of robots, by the one or more hardware processors. Further, the method includes computing, a next activity associated with each robot based on a Deep Learning (DL) analytics, wherein the DL analytics is based on an optimal resource allocation technique to minimize computation cost and learning time, by: (i) segmenting, each task from the set of tasks into a plurality of sub action windows, wherein an execution time associated with each sub action window is equal (ii) selecting an optimal computing device from a plurality of computing devices based on an optimal load distribution technique, wherein the optimal load distribution technique is a master slave framework with a master computing device and a plurality of slave computing devices and computing, by the optimal computing device, the next activity associated with the plurality of robots by analyzing the plurality of sub action windows based on a pre-trained stateful LSTM (Long Short Term Memory), by the one or more hardware processors. Furthermore, the method includes detecting, a fault associated with each robot from the plurality of robots by comparing, the next activity with the actual activity of the robot, by the one or more hardware processors.

In another aspect, a system for fault detection in robotic actuation is provided. The system includes a plurality of mobile robots, wherein each mobile robot from the plurality of mobile robots is associated with an actuation data gathering unit, wherein the actuation data gathering unit includes a plurality of sensors. A plurality of computing devices, wherein each computing device includes one or more memories comprising programmed instructions, a repository for storing the set of tasks associated with each mobile robot, one or more hardware processors operatively coupled to the one or more memories, wherein the one or more hardware processors are capable of executing the programmed instructions stored in the one or more memories and a Deep Learning (DL) analytics, wherein the DL analytics unit is configured to receive, a set of tasks in the form of time series from the actuation data gathering unit associated with each mobile robot from the plurality of mobile robots, wherein the a set of tasks comprises a set of actuation data associated with each mobile robot from the plurality of mobile robots. Furthermore the DL analytics unit is configured to compute, a next activity associated with each mobile robot based on a Deep Learning (DL) analytics, wherein the DL analytics is based on an optimal resource allocation technique to minimize computation cost and learning time, by: (i) segmenting, each task from the set of tasks into a plurality of sub action windows, wherein an execution time associated with each sub action window is equal (ii) selecting an optimal computing device from a plurality of computing devices based on an optimal load distribution technique, wherein the optimal load distribution technique is a master slave framework with a master computing device and a plurality of slave computing devices and (iii) computing, by the optimal computing device, the next activity associated with the plurality of robots by analyzing the plurality of sub action windows based on a pre-trained stateful LSTM (Long Short Term Memory). Furthermore, the DL analytics unit is configured to detect, a fault associated with each robot from the plurality of robots by comparing, the next activity with the actual activity associated with the robot.

In yet another aspect, a computer program product comprising a non-transitory computer-readable medium having embodied therein a computer program for system and method for fault detection in robotic actuation, is provided. The computer readable program, when executed on a computing device, causes the computing device to receive, a set of tasks in the form of time series from a plurality of robots, wherein the a set of tasks comprises a set of actuation data associated with each robot from the plurality of robots. Further, the computer readable program, when executed on a computing device, causes the computing device to compute, a next activity associated with each robot based on a Deep Learning (DL) analytics, wherein the DL analytics is based on an optimal resource allocation technique to minimize computation cost and learning time, by: (i) segmenting, each task from the set of tasks into a plurality of sub action windows, wherein an execution time associated with each sub action window is equal (ii) selecting an optimal computing device from a plurality of computing devices based on an optimal load distribution technique, wherein the optimal load distribution technique is a master slave framework with a master computing device and a plurality of slave computing devices and (iii) computing, by the optimal computing device, the next activity associated with the plurality of robots by analyzing the plurality of sub action windows based on a pre-trained stateful LSTM (Long Short Term Memory). Furthermore, the computer readable program, when executed on a computing device, causes the computing device to detect, a fault associated with each robot from the plurality of robots by comparing, the next activity with the actual activity associated with the robot.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
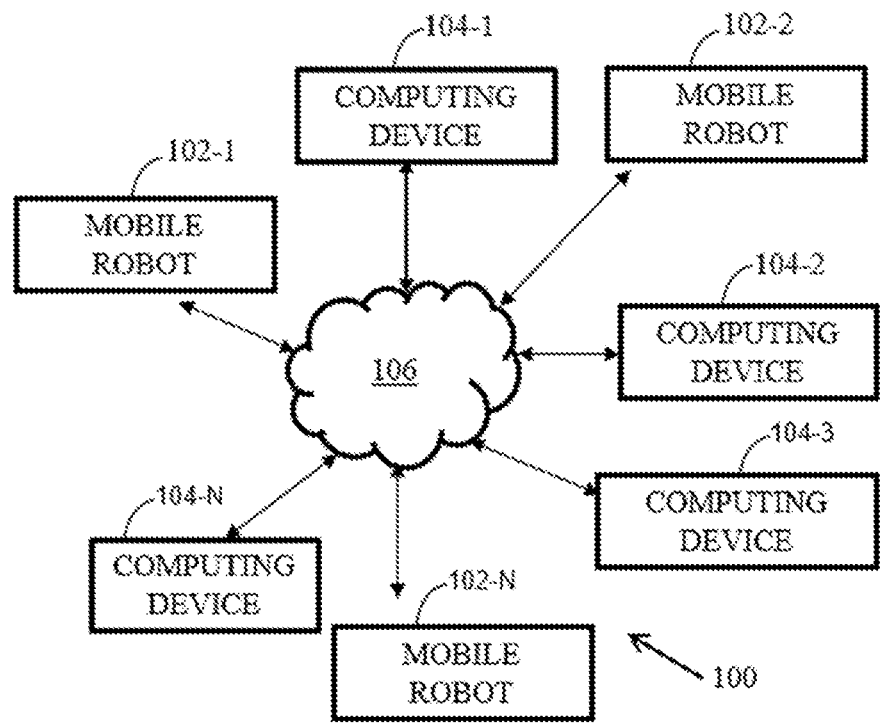
FIG. 1 illustrates an example networking environment for system and method for fault detection in robotic actuation, according to some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter overcomes the limitations of the conventional methods for fault detection in robotic actuation by a data driven approach. In the disclosure, a Long Short Term Memory (LSTM) based computation is utilized to train and match a set of activities associated with a plurality of robots based on a set of tasks gathered from the plurality of robots in a multi robot environment. In an embodiment, the LSTM is implemented in a Recurrent Neural Network (RNN). The Long Short Term memory is a memory cell based deep learner utilized to make decisions on continuous data or time-series. The LSTM includes a plurality of cells and each cell can be one among a "remembering" cell or a "forgetting" cell. The "remembering" cell represents some patterns of the data corresponding to a label and the "forgetting" cell represents some patterns of the data, not contributing to a relevant discretion. Further, the LSTM is a special type of artificial neural network, wherein the hidden layers includes feedback loops to allow prediction of a current state based on a pervious state and a new input data. Further, a plurality of processing and non-linear transition is performed at LSTM cells of RNN to adjust the Neural Network (NN) to form a model. The model can be further utilized to predict new sets of data. In the present disclosure, the RNN based computation network is trained to predict a next activity of the robot by utilizing a stateful Long Short Term Memory (LSTM) network. Stateful LSTM predicts the next activity associated with the robot by utilizing a set of previous observations and creates state transitions. Wherein, the activities includes grasp, pick, place, carry and clean. Further, the LSTM based computation requires high computation power and memory. Hence, the each robot offloads the set of tasks to a plurality of computing devices. Wherein, the set of tasks includes motion data and acceleration data associated with each robot. In an embodiment, the plurality of computing devices can be external servers. In another embodiment, each robot can carry one or more edge computing devices for LSTM based computation and in another embodiment, each robot carries a fog computing device for LSTM based computation. For example, the edge and fog computing devices includes a router, a network gateway and a wifi access point. An implementation of the system and method for fault detection in robotic actuation is described further in detail with reference to FIGS. 1 through 9.

Referring now to the drawings, and more particularly to FIGS. 1 through 9, where similar reference characters denote corresponding features consistently throughout the figures, there are shown preferred embodiments and these embodiments are described in the context of the following exemplary system and/or method.

FIG. 1 illustrates an example networking environment for a system and method for fault detection in robotic actuation, according to an example embodiment of the present subject matter. The system for fault detection in robotic actuation 100, hereinafter referred to as the system 100, includes a plurality of mobile robots 102-1, 102-2 . . . 102-N, collectively called as mobile robots 102 and a plurality of computing devices 104-1, 104-104-N, collectively called as computing devices 104. The plurality of computing devices can be one among a variety of computing systems, such as a laptop computer, a desktop computer, a notebook, a workstation, a cloud-based computing device, a router, a network gateway, a sensor gateway, a wifi access point and the like. In one implementation, the system 100 may be implemented in a cloud-based environment. In another implementation, the system 100 can be implemented in a cloud-edge environment and in yet another implementation, the system 100 can be implemented in a cloud-fog environment. The plurality of mobile robots and the plurality of computing devices are communicatively coupled through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the each other through communication links.

In an embodiment, each mobile robot from the plurality of mobile robots 102 includes an actuation data gathering unit, attached to each mobile robot from the plurality of mobile robots 102, to receive and send a set of actuation data from a plurality of sensors. The plurality of sensors including an accelerometer, a gyroscope and a magnetometer attached to each mobile robot.

Figure 2:
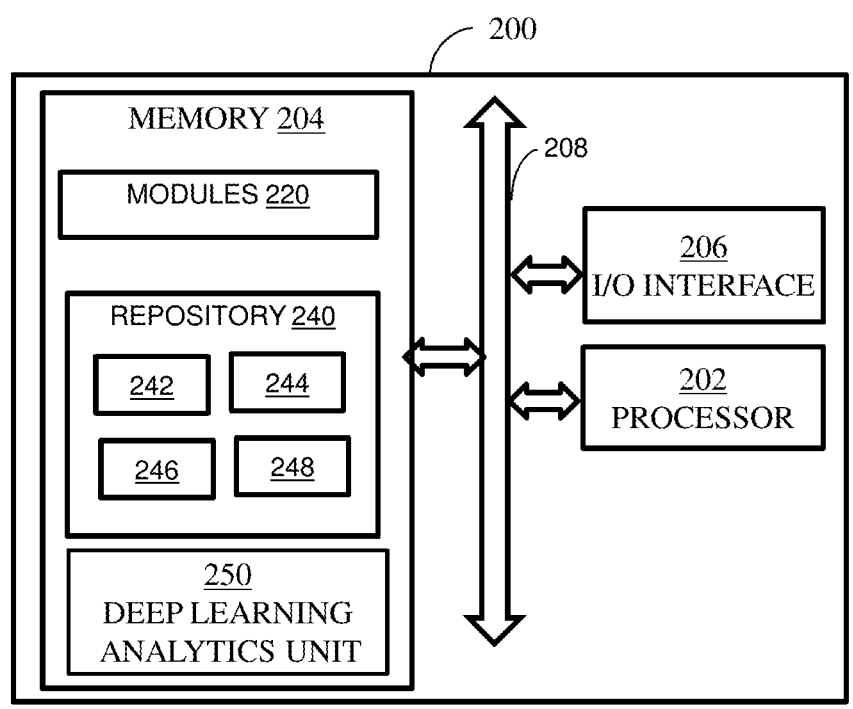
FIG. 2 illustrates a block diagram of a computing device 104, according to some embodiments of the present disclosure.

FIG. 2 illustrates a block diagram of a computing device 104, according to some embodiments of the present disclosure. The computing device 200 (hereinafter referred to as system 200) includes or is otherwise in communication with one or more hardware processors such as a processor 202, at least one memory such as a memory 204, an I/O interface 206 and a Deep Learning (DL) analytics unit 250. In an embodiment, the DL analytics unit 250 comprising a segmentation module (not shown in FIG. 2), an optimal computing device selection module (not shown in FIG. 2), and a next activity computation module (not shown in FIG. 2). The processor 202, memory 204, and the I/O interface 206 may be coupled by a system bus such as a system bus 208 or a similar mechanism.

The I/O interface 206 may include a variety of software and hardware interfaces, for example, a web interface, a graphical user interface, and the like. The interfaces 206 may include a variety of software and hardware interfaces, for example, interfaces for peripheral device(s), such as a keyboard, a mouse, an external memory, a camera device, and a printer. Further, the interfaces 206 may enable the system 200 to communicate with other devices, such as web servers and external databases. The interfaces 206 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 206 may include one or more ports for connecting a number of computing systems with one another or to another server computer. The I/O interface 206 may include one or more ports for connecting a number of devices to one another or to another server.

The hardware processor 202 may be implemented as one or more microprocessors, microcomputers, microcontrollers, digital signal processors, central processing units, state machines, logic circuitries, and/or any devices that manipulate signals based on operational instructions. Among other capabilities, the hardware processor 202 is configured to fetch and execute computer-readable instructions stored in the memory 204.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 204 includes a plurality of modules 220 and a repository 240 for storing data processed, received, and generated by one or more of the modules 220 and the DL analytics unit 250. The modules 220 may include routines, programs, objects, components, data structures, and so on, which perform particular tasks or implement particular abstract data types.

The memory 204 also includes module(s) 220 and a data repository 240. The module(s) 220 include programs or coded instructions that supplement applications or functions performed by the fault detection in robotic actuation system 100. The modules 220, amongst other things, can include routines, programs, objects, components, and data structures, which perform particular tasks or implement particular abstract data types. The modules 220 may also be used as, signal processor(s), state machine(s), logic circuitries, and/or any other device or component that manipulates signals based on operational instructions. Further, the modules 220 can be used by hardware, by computer-readable instructions executed by a processing unit, or by a combination thereof. The modules 220 can include various sub-modules (not shown). The modules 220 may include computer-readable instructions that supplement applications or functions performed by fault detection in robotic actuation system 100.

The data repository 240 may include received set of tasks, a training database 244, a test database 246 and other data 248. Further, the other data 248 amongst other things, may serve as a repository for storing data that is processed, received, or generated as a result of the execution of one or more modules in the module(s) 220 and the modules associated with the DL analytics unit 250.

Although the data repository 240 is shown internal to the system 200, it will be noted that, in alternate embodiments, the data repository 240 can also be implemented external to the system 200, where the data repository 240 may be stored within a database (not shown in FIG. 2) communicatively coupled to the system 200. The data contained within such external database may be periodically updated. For example, new data may be added into the database (not shown in FIG. 2) and/or existing data may be modified and/or non-useful data may be deleted from the database (not shown in FIG. 2). In one example, the data may be stored in an external system, such as a Lightweight Directory Access Protocol (LDAP) directory and a Relational Database Management System (RDBMS). In another embodiment, the data stored in the data repository 240 may be distributed between the 200 and the external database.

Figure 3A:
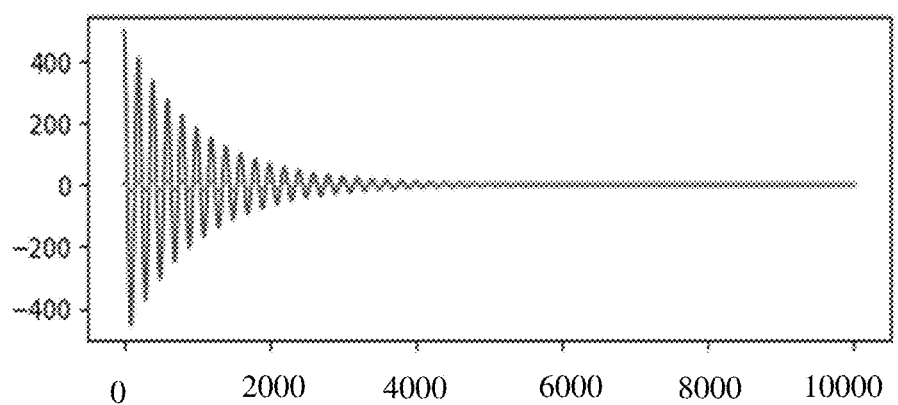
FIG. 3A. illustrates an example time series data when a robot moves a hand in low speed, according to some embodiments of the present disclosure.
Figure 3B:
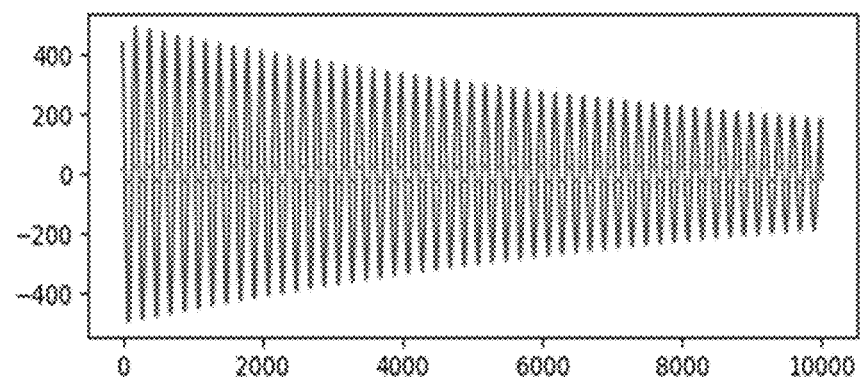
FIG. 3B. illustrates an example time series data when the robot moves the hand in high speed, according to some embodiments of the present disclosure.

The DL analytics unit 250 of the system 200 can be configured to receive, a set of tasks in the form of time series from a plurality of robots, wherein the set of tasks includes a set of actuation data associated with each robot from the plurality of robots. Wherein, the set of actuation data includes a set of displacement data and a set of rotation data. Wherein, the actuation data is gathered from each robot by the actuation data gathering unit. In an embodiment, the actuation data gathering unit is a device implanted on each robot. In another embodiment, the actuation data gathering unit can be an external hardware device wearable by each robot to send acceleration and motion data from a plurality of sensors. The plurality of sensors including the accelerometer and the gyroscope. For example, the time series data when the robot moves a hand in low speed is as shown in FIG. 3A. The time series data when the robot moves the hand in high speed is as shown in FIG. 3B.

Figure 4:
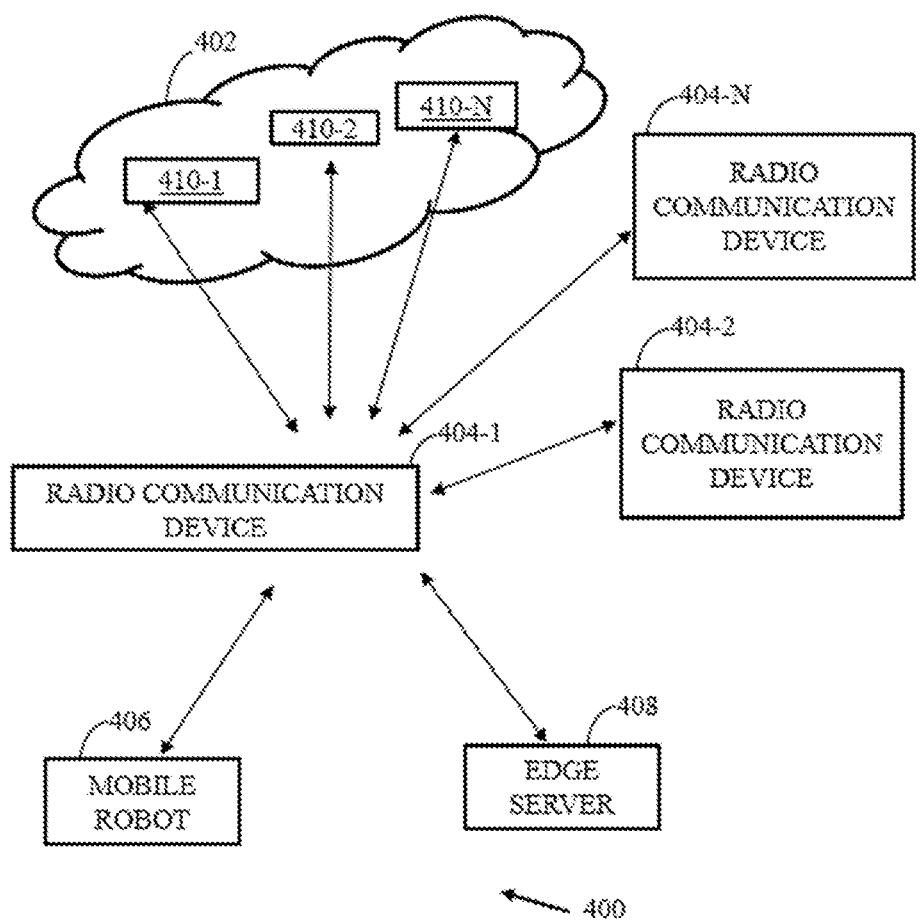
FIG. 4 illustrates an example master slave framework implementation of the system 100 in an edge-cloud environment, according to some embodiments of the present disclosure.

Further, the DL analytics unit 250 of the system 200 can be configured to compute a next activity associated with each robot based on a Deep Learning (DL) analytics, wherein the DL analytics is a RNN based LSTM, trained based on an optimal resource allocation technique to minimize computation cost and learning time, by:
(i) Segmenting, each task from the set of tasks into a plurality of sub action windows, wherein an execution time associated with each sub action window is equal.
(ii) (ii) Selecting an optimal computing device from a plurality of computing devices based on an optimal load distribution technique, wherein the optimal load distribution technique is a master slave framework with a master computing device and a plurality of slave computing devices. In an embodiment, the master slave framework for the optimal load distribution can be implemented in an edge-cloud environment as shown in FIG. 4.
(iii) Computing, by the optimal computing device, the next activity associated with the plurality of robots by analyzing the plurality of sub action windows based on a pre-trained stateful LSTM (Long Short Term Memory).

FIG. 4 illustrates an example master slave framework implementation of the system 100 in an edge-cloud environment, according to some embodiments of the present disclosure. Referring now to FIG. 4, the system 400 includes a cloud network 402, a plurality of radio communication devices 404-1, 404-2 . . . 404-N, a mobile robot 406, an edge server 408 and a plurality of cloud computing nodes 410-1, 410-2 . . . 410-N. In an embodiment, the set of tasks gathered from the mobile robot 406 is further offloaded to the edge server 408 and the edge server 408 performs load distribution among the plurality of cloud computing nodes. The edge server 408 acts as the master computing device and the plurality of cloud computing nodes acts as slave computing devices. Each slave computing device broadcasts the corresponding resource configuration with the master computing device.

In an embodiment, the set of tasks are distributed by the master computing device to one or more slave computing devices based on the optimal distribution technique. Wherein, the master slave framework is pre-trained to perform the optimal load distribution for executing the stateful LSTM with minimum computation based on server computing power, network latency, computation cost and data transfer cost. In an embodiment, the optimal distribution technique is explained as follows:
Given a Tensor Flow code, let the set of Layer Operations (LOs)=$\{l_1, l_2, l_3, l_4, \ldots, l_n\}$, a set of computing devices (Edge or cloud computing devices) be $\{g_1, g_2, g_3, g_4, \ldots, g_m\}$, $P_i^{l_j}$ be the processing time per computing device for LO, $l_j$, $N_i^{l_j}$ be the network transfer time required for model parameter and the result exchange by the tensor Flow middleware between the computing device $g_i$ and the master computing device for LO $l_j$ and $C_i^{l_j}$ be the computation cost for the $i^{th}$ edge computing device $g_i$ for $j^{th}$ LO $l_j$. The assignment variable with minimizing learning time and computation cost is given in equation 1.

$$x_{ij} = \begin{cases} 1, & \text{if } l_j \text{ is assigned to } g_i \\ 0, & \text{otherwise} \end{cases} \quad (1)$$

Further, the master computing device solves the following optimization problem to compute the value of $x_{ij}$:

$$\min(\alpha * \max((P_i+N_i)*\Sigma_{j=1}^{n}x_{ij})+\beta*C_i^{l_j}*\Sigma_{j=1}^{n}x_{ij}), \forall: 1 \le i \le m$$

such that, $$\Sigma_{j=1}^{n}x_{ij}=1 \ldots \forall_i: 1 \le i \le m \quad (2)$$

$$\max(((P_i+N_i) \le T \ldots \forall_i: 1 \le i \le n \quad (3)$$

Here, $\alpha$ and $\beta$ are constituent parameters. Further, equation 2 indicated that each LO is assigned to exactly one computing device and the equation 3 indicates that the make span for the DL technique's execution must be less than the deadline T specified by the master computing device which assigned task to the slave computing device.

In an embodiment, the method of computing, by the optimal computing device, the next activity associated with the plurality of robots by analyzing the plurality of sub action windows based on a pre-trained stateful LSTM (Long Short Term Memory) includes (i) receiving the plurality of sub action windows (ii) computing a probabilistic trellis from the plurality of sub action windows, wherein the probabilistic trellis is computed by utilizing a set of prior probabilistic transitions (iii) computing a set of posterior probability based on the probabilistic trellis and (iv) computing the next activity associated with the plurality of robots based on the set of posterior probability.

In an embodiment, computing the probabilistic trellis from the plurality of sub action windows, wherein the probabilistic trellis is computed by utilizing a set of prior probabilistic transitions is as follows. Here, the probability trellis is the term given to a series of probabilities associated with a series of transitions and the prior probability is computed based on a plurality of simulation results and a plurality of experimental results.

In an embodiment, computing the set of posterior probability based on the probabilistic trellis. The prior probability is computed based on actual robot movement in deployment scenario and the prior probability can be different for each robot.

In an embodiment, computing the next activity associated with the plurality of robots based on the set of posterior probability is as follows: an activity is a set of actions over time. During an activity life-cycle, the set of actions transitions from one action to another action in a probabilistic manner. During robotic simulations, the set of actions transitions for a complex activity are recorded to create a prior probability distribution associated with the complex activity. Further, actual trials are performed and the prior probability is converted to posterior probability. However, the model remains probabilistic as updates may occur due to modified environment. The actions are taken as unit of translation and rotation in 6 Degrees Of Freedom (DOF) using stop-to-stop segments. Further, the stateful LSTM is trained over a plurality of trials to predict the next segment for the given activity. Once the next segment is removed from dictionary, the same LSTM outputs the next most probable segment. Similarly, a probability model is created based on the plurality of trials.

In an embodiment, pre-training the stateful LSTM includes (i) receiving the set of actuation data associated with the robot from a database (ii) detecting a plurality of action units using displacement and rotation values associated with the set of actuation data (iii) computing a prior probability associated with the plurality of action units and (iv) training the stateful LSTM network based on the prior probability.

Further, the DL analytics unit 250 of the system 200 can be configured to detect a fault associated with each robot from the plurality of robots by comparing, the next activity with the actual activity associated with the robot. The predictions and the associated probability are utilized to obtain deviations from the actual activity associated with the robot. Further, the actuation associated with the robot is changed based on certain thresholds.

Figure 5:
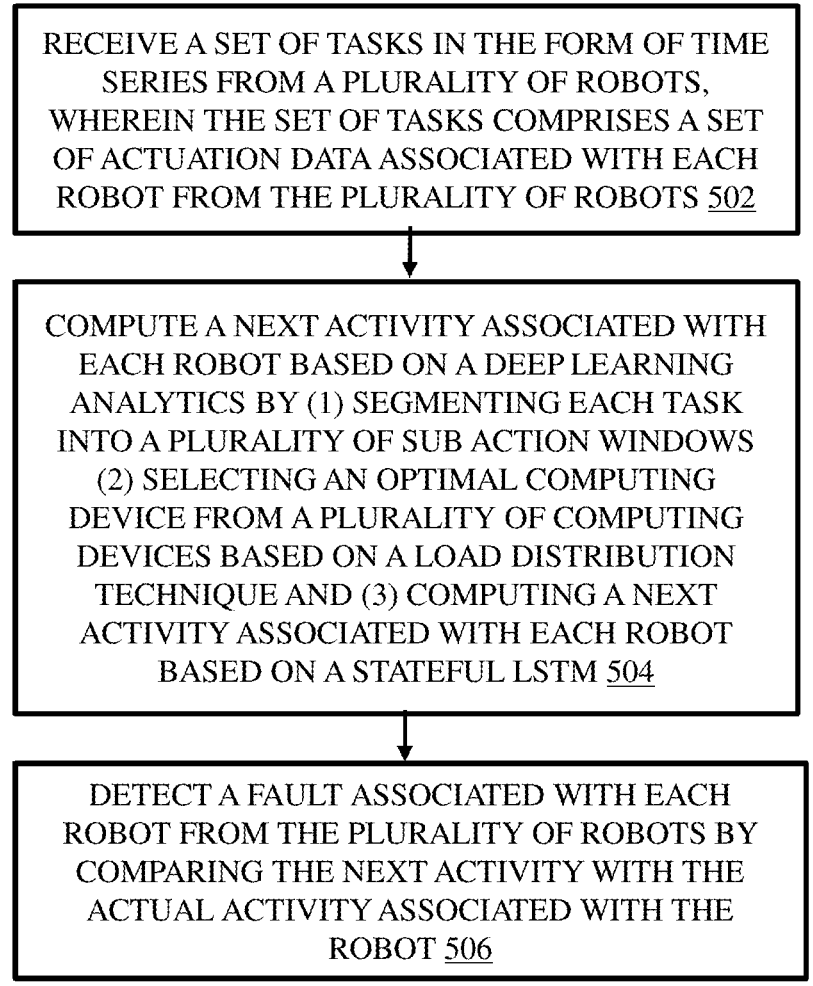
FIG. 5 illustrates a flow diagram for the method 400 for fault detection in robotic actuation, according to some embodiments of the present disclosure.

FIG. 5 illustrates a flow diagram for the method 500 for fault detection in robotic actuation, according to some embodiments of the present disclosure. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communication network. The order in which the method 500 is described is not intended to be construed as a limitation, and any number of the described method blocks can be combined in any order to implement the method 500, or an alternative method. Furthermore, the method 500 can be implemented in any suitable hardware, software, firmware, or combination thereof.

At 502, the system 200 receives, by the one or more hardware processors, a set of tasks in the form of time series from a plurality of robots, wherein the set of tasks comprises a set of actuation data associated with each robot from the plurality of robots. The set of actuation data includes a set of displacement data and a set of rotation data. At 504, the system 200 computes, by the one or more hardware processors, a next activity associated with each robot based on a Deep Learning (DL) analytics, wherein the DL analytics is based on an optimal resource allocation technique to minimize computation cost and learning time, by: (i) segmenting, each task from the set of tasks into a plurality of sub action windows, wherein an execution time associated with each sub action window is equal (ii) selecting an optimal computing device from a plurality of computing devices based on an optimal load distribution technique, wherein the optimal load distribution technique is a master slave framework with a master computing device and a plurality of slave computing devices. The plurality of computing devices is at least one of a fog computing device, an edge computing device and a cloud computing device and (iii) computing, by the optimal computing device, the next activity associated with the plurality of robots by analyzing the plurality of sub action windows based on a pre-trained stateful LSTM (Long Short Term Memory). At 506, the system 200 detects, by the one or more hardware processors, a fault associated with each robot from the plurality of robots by comparing, the next activity with the actual activity associated with the robot.

Figure 6:
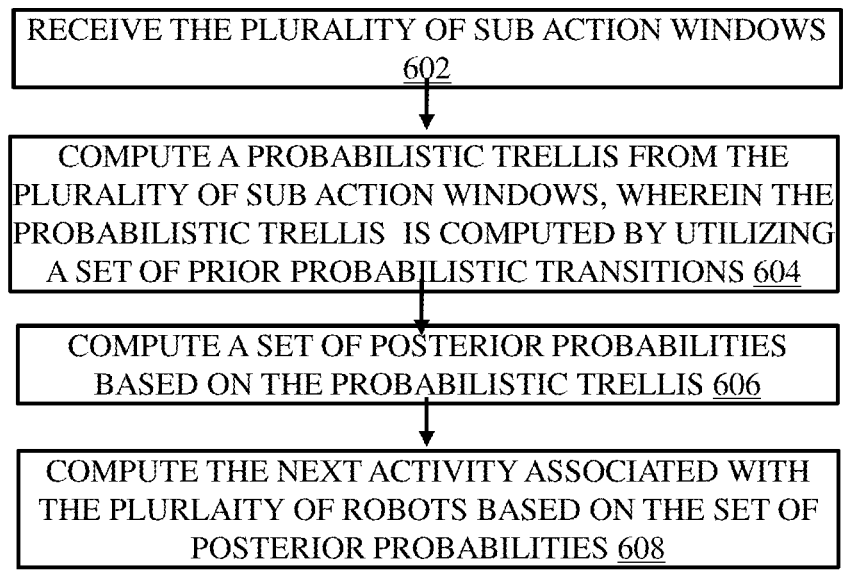
FIG. 6 illustrates an example flow diagram for computing next activity associated with a robot based on a stateful LSTM, according to some embodiments of the present disclosure.

FIG. 6 illustrates an example flow diagram for computing next activity associated with a robot based on a stateful LSTM, according to some embodiments of the present disclosure. Referring now to FIG. 6, at step 602, the plurality of sub action windows are received. At step 604, a probabilistic trellis from the plurality of sub action windows is computed, wherein the probabilistic trellis is computed by utilizing a set of prior probabilistic transitions. At step 606, a set of posterior probability based on the probabilistic trellis is computed. At step 608, the next activity associated with the plurality of robots based on the set of posterior probabilities is computed.

Figure 7:
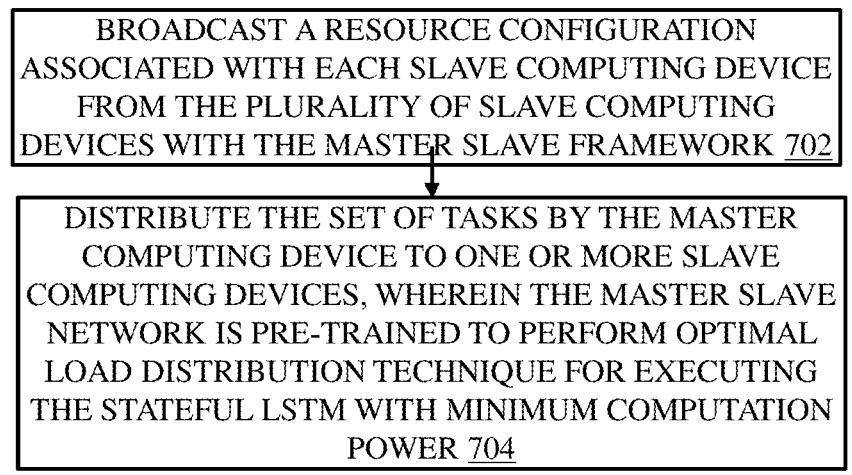
FIG. 7 illustrates an example flow diagram for optimal load distribution technique associated with a master slave framework, according to some embodiments of the present disclosure.

FIG. 7 illustrates an example flow diagram for optimal load distribution technique associated with a master slave framework LSTM, according to some embodiments of the present disclosure. Referring now to FIG. 7, at step 702, a resource configuration associated with each slave computing device is broadcasted from the plurality of slave computing devices with the master slave framework. At step 704, the set of tasks is distributed by the master computing device to one or more slave devices based on the optimal distribution technique, wherein the master slave framework is pre-trained to perform the optimal load distribution for executing the stateful LSTM with minimum computation based on server computing power, network latency, computation cost and data transfer cost.

Figure 8:
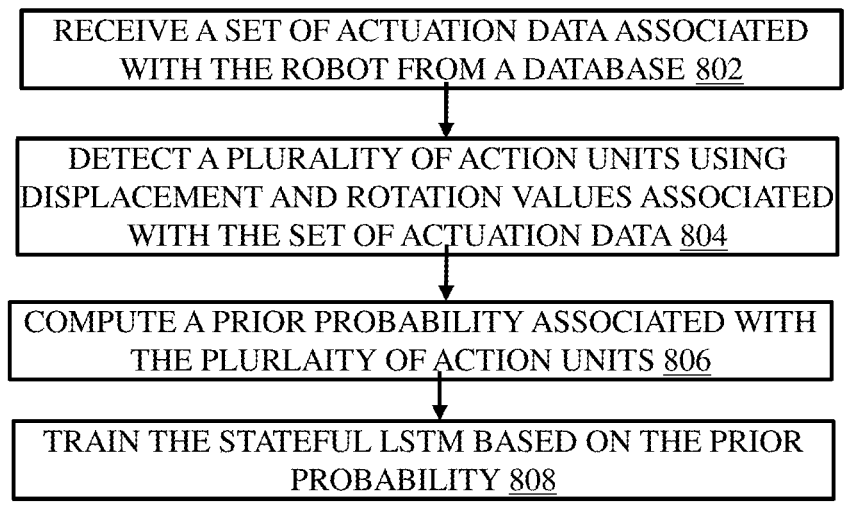
FIG. 8 illustrates an example flow diagram for pre-training of the stateful LSTM, according to some embodiments of the present disclosure.

FIG. 8 illustrates an example flow diagram for pre-training of the stateful LSTM, according to some embodiments of the present disclosure. Referring now to FIG. 8, at step 802, the set of actuation data associated with the robot from a database is received. At step 804, a plurality of action units is detected using displacement and rotation values associated with the set of actuation data. At step 806, a prior probability associated with the plurality of action units is computed. At step 808, the stateful LSTM is trained based on the prior probability.

In an embodiment, the Artificial Neural Network (ANN), for example, the LSTM includes a plurality of hyperparameters and the plurality of hyperparameters are tuned for optimal resource usage. The ANN is trained to benchmark the resource requirement of running the ANN on a complex activity detection application while utilizing the edge server and a plurality of mobile device configurations. The ANN includes a plurality of hyperparameters and the plurality of hyperparameters play an important role in determining accuracy of classification and prediction. In one embodiment, the plurality of hyperparameters are tuned in an automatic manner. In another embodiment, the plurality of hyperparameters are tuned manually. Further, a plurality of results obtained during tuning of the plurality of hyperparameters are benchmarked to understand end utilize effect of the plurality of hyperparameters on system resources including CPU/RAM needed for running the fault detection in robotic actuation system 100 on the plurality of robots and the plurality of computing devices. In an embodiment, an example robotic activity detection using the ANN is as shown in FIG. 9.

Figure 9:
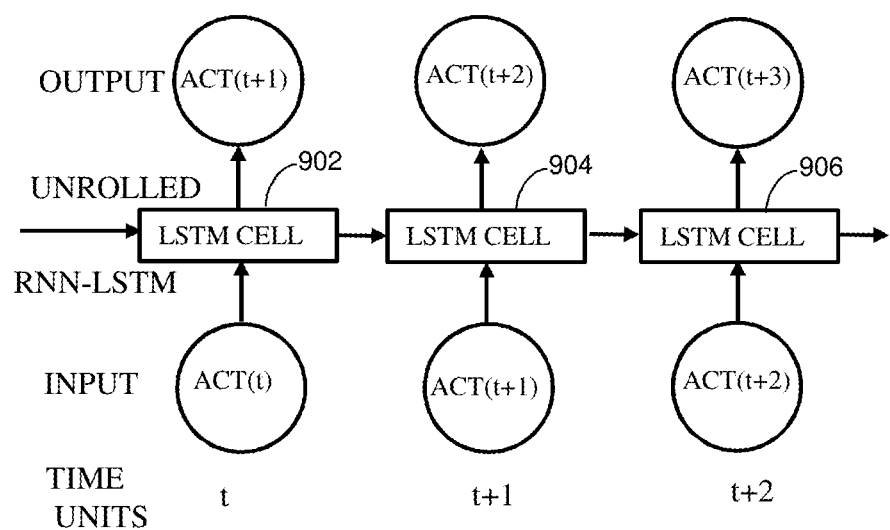
FIG. 9 illustrates an example use case for detecting an activity associated with the robot using the stateful LSTM, according to some embodiments of the present disclosure.

FIG. 9 illustrates an example use case for detecting an activity associated with the robot using the ANN, according to some embodiments of the present disclosure. Here, each activity is associated with a set of actuation data including a displacement data (d) and a rotation data (r). For example, considering 'w' as window length, for each window the actuation data are given below:

$$ACT0 = \{\{d0, r0\}, \{d1, r1\} \ldots \{d(w-1), r(w-1)\}\}$$

$$ACT1 = \{\{dw, rw\}, \{d(w+1), r(w+1)\} \ldots \{d(2w-1), r(2w-1)\}\}$$

$$\vdots$$

$$ACTn = \{d(tw), r(tw)\},$$

$$\{d(tw+1), r(tw+1)\} \ldots \{d((t+1)w-1), r((t+1)w-1)\}\}$$

Referring now to FIG. 9, each LSTM cell predicts the next activity based on the previous activity and the current set of actuation data. The LSTM cell 902 predicts an activity ACT(t+1) at time t+1 based on the activity ACT(t) at time t and the set of actuation data at time t+1. Similarly the LSTM cell 904 predicts an activity ACT(t+2) at time t+2 based on the activity ACT(t+1) at time t+1 and the set of actuation data at time t+2. The LSTM cell 906 predicts an activity ACT(t+3) at time t+3 based on the activity ACT(t+2) at time t+2 and the set of actuation data at time t+3. Similarly, the $n^{th}$ activity ACT(n) can be obtained by utilizing equation 4.

$$ACT(n) = \{\{d((t+1)w), r((t+1)w)\}, \{d((t+1)w+1), r((t+1)w+1)\} \ldots \{d((t+2)w-1), r((t+1)w-1)\}\} \quad (4)$$

In an embodiment, the system 100 can be deployed in a multi-robot rescue mission wherein a plurality of humanoid robots can detect dangers and can perform recovery operations. The plurality of humanoid robots are assisted by the plurality of edge computing devices for inferencing task. Each humanoid robot send the actuation data to the edge computing devices through the network. The Edge servers are also constrained in terms of energy but can perform complex computation. In an embodiment, the plurality of humanoid robots can carry and place the one or more edge computing devices in strategic locations. The plurality of edge computing devices can assist the plurality of humanoid robots for running complex computation task. The Edge servers utilizes trained models of expected robot actuation tasks to infer whether the operations were performed correctly.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed methods and system for fault detection in robotic actuation are able to provide an end-to-end solution for detecting faults in the robotic actuation in a non-invasive way. Further, the utilization of high performance computing devices including edge computing devices and fog computing devices in a cloud based network reduces the latency in processing thus increased the accuracy of the system 100. An optimal computing device is selected based on an optimal load distribution technique. Further, the next activity associated with the robot is predicted by utilizing a stateful LSTM with increased accuracy.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for fault detection in robotic actuation, the method comprising:
   receiving, by one or more hardware processors, a set of tasks in the form of time series from a plurality of robots, wherein the set of tasks comprises a set of actuation data associated with each robot from the plurality of robots;
   computing, by the one or more hardware processors, a next activity associated with each robot based on a Deep Learning (DL) analytics, wherein the DL analytics is based on an optimal resource allocation technique to minimize computation cost and learning time, by:
   (i) segmenting, each task from the set of tasks into a plurality of sub action windows, wherein an execution time associated with each sub action window is equal;
   (ii) selecting an optimal computing device from a plurality of computing devices based on an optimal load distribution technique, wherein the optimal load distribution technique is a master slave framework with a master computing device and a plurality of slave computing devices, and wherein the master slave framework is pre-trained to perform the optimal load distribution for executing a stateful Long Short Term Memory (LSTM); and
   (iii) computing, by the optimal computing device, the next activity associated with the plurality of robots by analyzing the plurality of sub action windows based on the pre-trained stateful LSTM, wherein computing the next activity associated with the plurality of robots comprises:
      receiving the plurality of sub action windows;
      computing a probabilistic trellis from the plurality of sub action windows, wherein the probabilistic trellis is computed by utilizing a set of prior probabilistic transitions recorded during robotic simulations;
      computing a set of posterior probability based on the probabilistic trellis, by performing a plurality of trials; and
      computing the next activity associated with the plurality of robots based on the set of posterior probability, using the pre-trained stateful LSTM; and
   detecting, by the one or more hardware processors, a fault associated with each robot from the plurality of robots by comparing, the next activity with the actual activity of the robot.

2. The method as claimed in claim 1, wherein the plurality of computing devices is at least one of a fog computing device, an edge computing device and a cloud computing device.

3. The method as claimed in claim 1, wherein the set of actuation data comprising a set of displacement data and a set of rotation data.

4. The method as claimed in claim 1, wherein the master slave framework for optimal load distribution with the master computing device and the plurality of slave computing devices further comprising:
   broadcasting a resource configuration associated with each slave computing device from the plurality of slave computing devices with the master slave framework; and
   distributing the set of tasks by the master computing device to one or more slave devices based on the optimal distribution technique.

5. The method as claimed in claim 1, wherein pre-training the stateful LSTM further comprising:
   receiving the set of actuation data associated with each robot from a database;
   detecting a plurality of action units using displacement and rotation values associated with the set of actuation data;
   computing a prior probability associated with the plurality of action units; and
   training the stateful LSTM network based on the prior probability.

6. A system for fault detection in robotic actuation, the system comprising:
   a plurality of mobile robots 102, wherein each mobile robot from the plurality of mobile robots is associated with an actuation data gathering unit, wherein the actuation data gathering unit comprising a plurality of sensors;
   a plurality of computing devices 104, wherein each computing device comprising one or more memories comprising programmed instructions, a repository for storing the set of tasks associated with each mobile robot, wherein one or more hardware processors operatively coupled to the one or more memories, wherein the one or more hardware processors are capable of executing the programmed instructions stored in the one or more memories and a Deep Learning (DL) analytics unit, and wherein the DL analytics unit is configured to:
      receive, a set of tasks in the form of time series from the actuation data gathering unit associated with each mobile robot from the plurality of mobile robots, wherein the set of tasks comprises a set of actuation data associated with each mobile robot from the plurality of mobile robots;
      compute, a next activity associated with each mobile robot based on a DL analytics, wherein the DL analytics is based on an optimal resource allocation technique to minimize computation cost and learning time, by:
      (i) segmenting, each task from the set of tasks into a plurality of sub action windows, wherein an execution time associated with each sub action window is equal;
      (ii) selecting an optimal computing device from a plurality of computing devices based on an optimal load distribution technique, wherein the optimal load distribution technique is a master slave framework with a master computing device and a plurality of slave computing devices, and wherein the master slave framework is pre-trained to perform the optimal load distribution for executing a stateful Long Short Term Memory (LSTM); and
      (iii) computing, by the optimal computing device, the next activity associated with the plurality of robots by analyzing the plurality of sub action windows based on the pre-trained stateful LSTM, wherein computing the next activity associated with the plurality of robots comprises:
         receiving the plurality of sub action windows;

computing a probabilistic trellis from the plurality of sub action windows, wherein the probabilistic trellis is computed by utilizing a set of prior probabilistic transitions recorded during robotic simulations;

computing a set of posterior probability based on the probabilistic trellis, by performing a plurality of trails; and computing the next activity associated with the plurality of robots based on the set of posterior probability, using the pre-trained stateful LSTM; and detect, a fault associated with each mobile robot from the plurality of mobile robots by comparing, the next activity with the actual activity associated with the mobile robot.

7. The system as claimed in claim 6, wherein the plurality of computing devices is at least one of a fog computing device, an edge computing device and a cloud computing device.

8. The system as claimed in claim 6, wherein the set of actuation data comprising a set of displacement data and a set of rotation data.

9. The system as claimed in claim 6, wherein the DL analytics unit is configured to perform the optimal load distribution technique based on the master slave framework with the master computing device and the plurality of slave computing devices by:

broadcasting a resource configuration associated with each slave computing device from the plurality of slave computing devices with the master slave framework; and distributing the set of tasks by the master computing device to one or more slave devices based on the optimal distribution technique.

10. The system as claimed in claim 6, wherein the DL analytics unit is configured to pre-train the stateful LSTM by:

receiving the set of actuation data associated with each robot from a database;

detecting a plurality of action units using displacement and rotation values associated with the set of actuation data;

computing a prior probability associated with the plurality of action units; and training the stateful LSTM network based on the prior probability.

11. One or more non-transitory machine readable information storage mediums for fault detection in robotic actuation, comprising:

receive, by one or more hardware processors, a set of tasks in the form of time series from a plurality of robots, wherein the set of tasks comprises a set of actuation data associated with each robot from the plurality of robots;

compute, by the one or more hardware processors, a next activity associated with each robot based on a Deep Learning (DL) analytics, wherein the DL analytics is based on an optimal resource allocation technique to minimize computation cost and learning time, by:

(i) segment, each task from the set of tasks into a plurality of sub action windows, wherein an execution time associated with each sub action window is equal;

(ii) select an optimal computing device from a plurality of computing devices based on an optimal load distribution technique, wherein the optimal load distribution technique is a master slave framework with a master computing device and a plurality of slave computing devices, and wherein the master slave framework is pre-trained to perform the optimal load distribution for executing a stateful Long Short Term Memory (LSTM); and (iii) compute, by the optimal computing device, the next activity associated with the plurality of robots by analyzing the plurality of sub action windows based on the pre-trained stateful LSTM, wherein computing the next activity associated with the plurality of robots comprises:

receiving the plurality of sub action windows;

computing a probabilistic trellis from the plurality of sub action windows, wherein the probabilistic trellis is computed by utilizing a set of prior probabilistic transitions recorded during robotic simulations;

computing a set of posterior probability based on the probabilistic trellis, by performing a plurality of trails; and computing the next activity associated with the plurality of robots based on the set of posterior probability, using the pre-trained stateful LSTM; and detect, by the one or more hardware processors, a fault associated with each robot from the plurality of robots by comparing, the next activity with the actual activity of the robot.

\* \* \* \* \*